Figure 1:
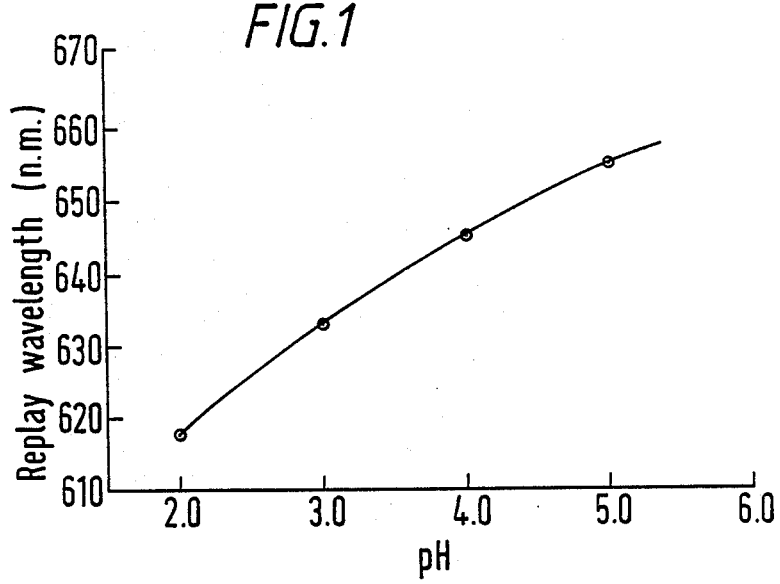

United States Patent [19]

Groves et al.

[11] Patent Number: 4,826,745
[45] Date of Patent: May 2, 1989

[54] METHOD OF PREPARING A HOLOGRAM

[75] Inventors: Trevor Groves, Northwich; David W. Butcher, Goostrey, both of England

[73] Assignee: Ciba-Geigy AG, Basel, Switzerland

[21] Appl. No.: 134,305

[22] Filed: Dec. 15, 1987

[30] Foreign Application Priority Data

Dec. 17, 1986 [GB] United Kingdom ............... 86301/86

[51] Int. Cl.[4] .......................... G03H 1/04; G03C 5/38; G03C 5/42; G03C 5/44
[52] U.S. Cl. .......................................... 430/1; 430/2; 430/393; 430/419; 430/430; 430/460; 430/461
[58] Field of Search ....................... 430/1, 2, 393, 419, 430/430, 460, 461

[56] References Cited

U.S. PATENT DOCUMENTS

| 3,728,118 | 4/1973 | Fillmore et al. | 430/1 |
| 3,967,963 | 7/1976 | Goraube | 430/1 |
| 4,025,345 | 5/1977 | Kido et al. | 430/1 |
| 4,032,348 | 6/1977 | Kido et al. | 430/1 |
| 4,601,975 | 7/1986 | Koboshi et al. | 430/430 |
| 4,656,106 | 4/1987 | Holland et al. | 430/2 |
| 4,717,647 | 1/1988 | Abe et al. | 430/430 |
| 4,720,441 | 1/1988 | Clark et al. | 430/2 |
| 4,748,097 | 5/1988 | Clark et al. | 430/419 |

Primary Examiner—Mukund J. Shah
Attorney, Agent, or Firm—Wenderoth, Lind & Ponack

[57] ABSTRACT

Method of preparing a hologram which is of the silver halide in gelatin binder type, which method comprises exposing, developing and bleaching the holographic material, where a water-soluble halide and a ferric salt of an acetic acid derivative are used in the bleach bath.

4 Claims, 1 Drawing Sheet

METHOD OF PREPARING A HOLOGRAM

The present invention relates to a method of preparing a hologram.

In theory a reflection hologram will replay using white light reconstruction, at about the wavelength of the coherent light which was used in the exposure to prepare it. However in practice, during the processing of holographic material there is usually some shrinkage of the gelatin binder and this causes, in general, the replay wavelength to be shorter than the wavelength of the laser used in the exposure of the material.

However it is often desirable that the replay wavelength of a hologram is the same or not markedly different from the wavelength of the laser light used in exposing the holographic material.

In the past some attempt has been made to obtain this wavelength holding by treating the hologram, which after production has a lower replay wavelength than the wavelength of the laser light used in its production, with a tanning developer such as pyrogallol or inorganic hardening agents such as aluminium salts to increase its replay wavelength but the results have not been satisfactory as they have not been reproducible. Other attempts have been made using organic swelling agents such as triethanolamine, but the effect produced by such agents is not permanent, probably due to the volatility of such swelling agents.

When the holographic material being exposed is of the silver halide in a binder type the usual processing sequence is silver halide development using a silver halide developing agent for example hydroquinone, followed by a silver bleaching process.

The silver bleaching step may be any process useful in photography of converting the developed silver to a silver ion, but which usually leaves the unexposed silver halide in situ. It is to be understood that the developed silver may be converted to silver halide some of which may remain in the holographic material.

Examples of bleaching techniques are solvent bleaching methods in which the developed silver is removed from the material and rehalogenating bleaching methods, in which the developed silver is converted to silver halide. It is the removal of the developed silver as well as excess bromide ion and water-soluble coating aids from the material which cause the binder to shrink and this lowers the replay wavelength.

The most popular holograms are reflection holograms and these are usually prepared using a rehalogenating bleach step. The hitherto preferred rehalogenating bleach bath comprises the ferric ammonium or sodium complex of ethylenediaminetetracetic acid and a water soluble halide. The use of a bleach bath of this type always causes a great loss in replay wavelength of the hologram compared with the wavelength of the laser light used to expose the material.

We have found a method of processing holograms the use of which prevents the great loss in replay wavelength from occuring.

Therefore according to the present invention there is provided a method of preparing a hologram which is of the silver halide in gelatin binder type which method comprises holographically exposing the material by use of coherent light, developing the holographic image by use of a silver halide developing solution and then either bleaching the developed silver by use of a rehalogenating bleach bath which comprises a water soluble halide and a ferric salt of either 1,3-diamino-2-propanol-N,N,N',N'-tetracetic acid or of iminodiacetic acid or bleaching the developed silver by use of a bleach bath and then treating the material with a bath which comprises a ferric salt of either 1,3-diamino-2-propanol-N,N,N',N'-tetracetic acid or iminodiacetic acid.

The ferric salt of 1,3-diamino-2-propanol-N,N,N',N'-tetracetic acid is hereinafter referred to as ferric DAPTA and the ferric salt of iminodiacetic acid is referred to as ferric IDA.

In the method of the present invention the preferred water-soluble halide to be used in the rehalogenating bleach is an alkali metal bromide. The preferred amount to be used is from 5 to 15 g per liter. The preferred alkali metal bromide is potassium bromide.

When the hologram is exposed to produce a reflection hologram wherein the interference fringes lie parallel to the base the greatest fall in replay wavelength is observed. Thus the process of the present invention is particularly applicable to the production of reflection holograms.

Both the pH of the solution and the concentration of either ferric DAPTA or ferric IDA in solution affect the replay wavelength. In general the higher the pH and the higher the concentration of ferric salt the greater the replay wavelength.

This effect is shown with respect to the use of ferric DAPTA on the accompanying FIGS. 1 and 2 the details of which are explained in the Example 2 hereinafter.

The following Examples will serve to illustrate the invention.

EXAMPLE 1

Use of ferric DAPTA and ferric IDA in rehalogenating bleach bath.

Samples of holographic material were prepared by coating onto a transparent photographic film base a gelatino silver halide emulsion which was substantially pure silver bromide having a mean crystal size of 0.03 microns at a silver coating weight of 30 mg/dm$^2$. The emulsion was optically sensitised with a red sensitising dye so that it was optimally sensitive to 633 nm the colour of a He:Ne laser.

The material was holographically exposed using the He:Ne laser by a Denisyuk exposure method using a brushed aluminium plate as an object to yield (after processing) a reflection hologram.

The material was then developed for 2 minutes at 30° C. in a solution of the following formulation:

Sodium Sulphite Anhydrous 30 g
Hydroquinone 10 g
Sodium Carbonate 60 g
Water to 1000 ml The samples were then washed in running water for 30 seconds and then transferred to three rehalogenating bleach baths of the following formulae:

| Bath 1 (control) | ferric ammonium E.D.T.A. (1.8 M Solution) | 150 ml |
|---|---|---|
| | potassium bromide | 10 g |
| | pH | 5.5. |
| | water to | 1 liter |
| Bath 2 (invention) | 1,3-diamino-2-propanol-N,N,N',N'—tetracetic acid (DAPTA) | 32 g. |
| | ferric nitrate | 40.4 g |
| | potassium bromide | 10 g |
| | pH | 3.0 |

| | -continued | |
|---|---|---|
| | water to<br>(this is equivalent to 0.1 molar of ferric DAPTA) | 1 liter |
| Bath 3<br>(invention) | iminodiacetic acid (IDA)<br>ferric nitrate<br>potassium bromide<br>pH<br>water to<br>(this is equivalent to 0.1 molar of ferric IDA) | 13.3 g<br>40.0 g<br>10 g<br>4.0<br>1 liter |

Bath 1 is a comparative bleach bach whilst Baths 2 and 3 are bleach baths of use in the present invention. The temperature of all the bleach baths was 30° C.

The samples of holographic material were soaked in baths 1 to 3 until all the silver had been bleached out which in all cases was less than five minutes.

The samples were then washed in running water for 5 minutes and then air dried.

The replay wavelength of the thus prepared holograms at maximum diffraction efficiency was determined for the samples bleached in Baths 1 to 3 using a Pye Unicam PU 8880/32 spectrophotometer with an attached integrating sphere.

The results are shown in Table 1 below.

TABLE 1

| Bleach Bath | Replay γ nm |
|---|---|
| 1 | 579 |
| 2 | 633 |
| 3 | 635 |

Thus the hologram which had been prepared using the process of the present invention exhibited a replay wavelength which was the same in the case of bath 2 and substantially the same in the case of bath 3 as the exposure wavelength which was 633 nm. On the other hand the hologram which had been processed using the bleach bath which is not useful in the process of the present invention in each case exhibited a marked fall in the replay wavelength.

EXAMPLE 2

Use of ferric DAPTA in rehalogenating bleach bath at different concentration ratios and at different pH-values.

Samples of the same holographic material as used in Example 1 were exposed using a He:Ne laser and were developed as in Example 1. They were then bleached in two series of rehalogenating bleach baths, all of which were based on ferric DAPTA as the bleaching agent.

Series 1: Formula for bleach bath as Bath 2 in Example 1 except that four different pH's for four baths was used. The pH's being 2.0, 3.0, 4.0 and 5.0. The effect on replay wavelength is shown in the accompanying FIG. 1. This shows that the higher the pH the greater the replay wavelength. The pH range of 2 to 5 covers the only useful range as below 1.5 ferric DAPTA is not fully stable and above 5.5 the bleach bath is not active enough.

Series 2: Formula for bleach bath as Bath 2 in Example 1 except that six different concentrations of ferric DAPTA were employed. These were 0.03, 0.05, 0.075, 0.1, 0.2 and 0.3 molar.

Figure 2:
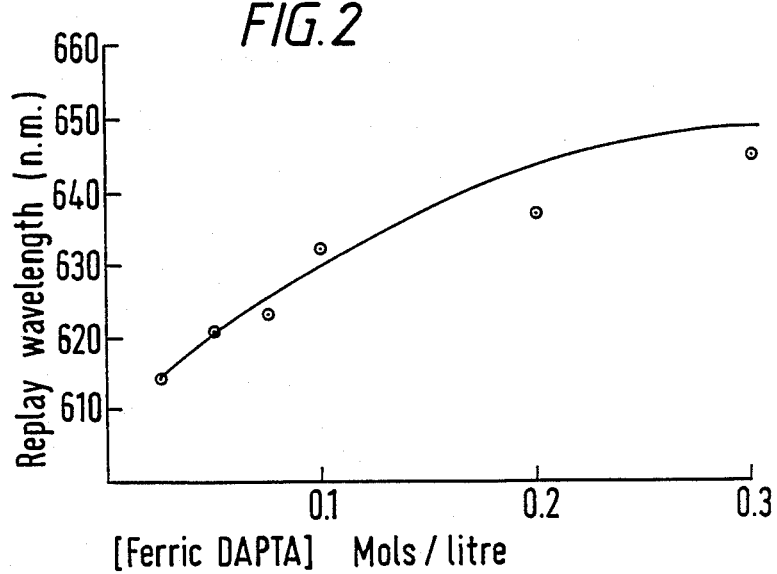

The effect on replay wavelength is shown in the accompanying FIG. 2. This shows that the higher the molar concentration of ferric DAPTA the greater the replay wavelength. However the effect of changing the molar concentration of ferric DAPTA is not so great as changing the pH.

EXAMPLE 3

Use of ferric DAPTA in a bath after the bleach bath.

Samples of the same holographic material as used in Example 1 were exposed using a He:Ne laser and were developed as in Example 1.

The samples were then transferred to rehalogenating bleach bath of the following composition:
Fe(NH$_4$)EDTA(1.8M Solution) 150 ml
KBr 20 g
pH 5.5
Water to 1000 ml until all silver metal had been bleached out which was about 2 minutes.

The samples were then water washed in running water for 1 minute and transferred individually to aqueous baths which consisted of solutions varying from 0.025 molar to 0.2 molar of aqueous ferric DAPTA for 5 minutes at range of pH's from 2 to 6. The temperature of solutions was 30° C.

The replay wavelength of the holograms produced by soaking in the various baths was as follows:

TABLE 2

| Solution | pH | replay in nm |
|---|---|---|
| Control (no ferric salt) | | 575 |
| Strength of ferric DAPTA solution | | |
| 0.025 molar | 2 | 605 |
| 0.050 molar | 2 | 607 |
| 0.100 molar | 2 | 612 |
| 0.200 molar | 2 | 622 |
| 0.025 molar | 4 | 622 |
| 0.050 molar | 4 | 626 |
| 0.100 molar | 4 | 637 |
| 0.200 molar | 4 | 645 |
| 0.025 molar | 6 | 600 |
| 0.050 molar | 6 | 637 |
| 0.100 molar | 6 | 625 |
| 0.200 molar | 6 | 637 |

This shows that at even the lowest concentration of ferric DAPTA an appreciable increase in replay wavelength is obtained over the control. In general the higher the concentration of the ferric DAPTA solution the greater the effect. Also in general the replay wavelength increases from pH 2 to pH 4 but decreases when pH 6 is used.

In every case the replay wavelength at the maximum diffraction efficiency was measured using a Pye Unicam Pu 8880/32 spectrophotometer with an integrating sphere attachment.

We claim:

1. A method of preparing a hologram which is of the silver halide in gelatin binder type which method comprises holographically exposing the material by use of coherent light, developing the holographic image by use of a silver halide developing solution and then either bleaching the developed silver by use of a rehalogenating bleach bath which comprises a water soluble halide and a ferric salt of either 1,3-diamino-2-propanol-N,N,N',N'-tetracetic acid or of iminodiacetic acid or bleaching the developed silver by use of a bleach bath and then treating the material with a bath which comprises a ferric salt of either 1,3-diamino-2-propanol-N,N,N',N'-tetracetic acid or iminodiacetic acid the replay wavelength of the hologram thus obtained being substantially the same as the wavelength of said coherent light used for exposure.

2. A method according to claim 1 wherein the pH of the solution which comprises the ferric DAPTA or ferric IDA is from 2 to 5.

3. A method according to claim 1 wherein the molar concentration in solution of either the ferric DAPTA or the ferric IDA is from 0.03 to 0.3.

4. A hologram which has been prepared by the method of claim 1.

* * * * *